US006039301A

United States Patent [19]

Westerhof

[11] Patent Number: 6,039,301

[45] Date of Patent: Mar. 21, 2000

[54] CONTAINER AND SEALING DEVICE FOR USE IN THE CONTAINER

[75] Inventor: Willem A. Westerhof, Drachten, Netherlands

[73] Assignee: U.S. Philips Corporation, New York, N.Y.

[21] Appl. No.: 08/925,953

[22] Filed: Sep. 9, 1997

[30] Foreign Application Priority Data

Apr. 22, 1997 [EP] European Pat. Off. ............. 972011811

[51] Int. Cl.[7] ...................................................... F16K 51/00

[52] U.S. Cl. .......................... 251/144; 251/353; 251/347; 251/149.1

[58] Field of Search .................................... 251/353, 347, 251/144, 149.1

[56] References Cited

U.S. PATENT DOCUMENTS

| | | | |
|---|---|---|---|
| 3,768,501 | 10/1973 | Elson et al. | 137/231 |
| 4,375,864 | 3/1983 | Savage | 222/81 |
| 4,905,963 | 3/1990 | Nichols | 251/144 |
| 5,425,478 | 6/1995 | Kotaki et al. | 222/501 |
| 5,509,433 | 4/1996 | Paradis | 137/1 |
| 5,606,988 | 3/1997 | Pawlowski, Jr. | 137/68.14 |
| 5,609,195 | 3/1997 | Stricklin et al. | 141/346 |
| 5,738,144 | 4/1998 | Rogers | 137/614.03 |
| 5,842,682 | 12/1998 | Schennum et al. | 251/149.1 |

FOREIGN PATENT DOCUMENTS

| | | | |
|---|---|---|---|
| 0451388A1 | 10/1991 | European Pat. Off. | B05B 9/08 |
| 1469929 | 4/1977 | United Kingdom | F16K 15/02 |
| 95/24972 | 9/1995 | WIPO | B05B 11/00 |
| 95/34903 | 12/1995 | WIPO | H01F 7/121 |

*Primary Examiner*—A. Michael Chambers
*Assistant Examiner*—Thomas L. McShane
*Attorney, Agent, or Firm*—Ernestine C. Bartlett

[57] ABSTRACT

A container has a wall which defines a space for holding a fluid and a sealing device connected to the wall. The sealing device comprises a coupling member having a seat and a channel which gives access to the space. The sealing device further comprises a valve, which has been formed separately from the coupling member and which is movable with respect to the coupling member in a first direction parallel to the channel from on open position, in which the channel is open, to a closed position, in which the valve cooperates with the seat and the channel is closed. The sealing device has two arms which position the valve in its open position and which support the valve in the first direction (5). The arms are separate from the seat and in its open position the valve (20) is clear of the seat. In this way a reliable sealing is achieved.

18 Claims, 4 Drawing Sheets

CONTAINER AND SEALING DEVICE FOR USE IN THE CONTAINER

BACKGROUND OF THE INVENTION

The invention relates to a container a container comprising a wall which defines a space for holding a fluid, and a sealing device connected to the wall, which sealing device comprises a coupling member having a seat and a channel which gives access to the space, a valve, which has been formed separately from the coupling member and which is movable with respect to the coupling member in a first direction parallel to the channel from on open position, in which the channel is open, to a closed position, in which the valve cooperates with the seat and the channel is closed, a shoulder for exerting a force on the valve in the first direction, which shoulder is accessible via the channel to move the valve from the open position to the closed position, and positioning means which position the valve in its open position with respect to the seat and which support the valve in said first direction.

The invention also relates to a sealing device for use in such a container.

Such a container and such a sealing device are known from U.S. Pat. No. 3,768,501. The known container comprises a bulb and a sealing device fitted in the neck of the bulb. The sealing device comprises a coupling member having a channel and a valve which is slidable in the channel from an open position to a closed position. The valve is tubular and is closed at a first end facing the interior of the bulb and open at a second end remote from the first end. The tubular valve further has a radial opening in the tubular wall. The coupling member is connected to the neck of the bulb and has a seat which fits snugly around the valve and in which the valve is slidable. In the closed position the seat and the valve form a seal of the bulb in that the radial opening in the valve occupies a position with respect to the seat outside the bulb. In the open position the radial opening in the valve occupies a position with respect to the seat inside the bulb and open communication with the space in the bulb is obtained via the radial opening in the valve. The bulb is filled with a gas by inserting a hollow filling needle into the tubular valve, thereby urging the valve into the open position. The filling needle has an opening which corresponds to the radial opening in the tubular wall of the valve, thus enabling the bulb to be filled via these openings. The filling needle has an arrow-shaped head which snaps behind an annular shoulder on the valve when the filling needle is inserted. In order to enable snap coupling to be formed the tubular valve has a radially projecting collar near its second end, which collar engages behind the seat of the coupling member. When the filling needle is inserted the valve is urged into its open position by the filling needle, causing said collar to engage against the seat. Thus, the valve is supported and as the filling needle is inserted deeper said snap coupling is formed. As the filling needle is withdrawn the valve is drawn into its closed position because it is coupled to the filling needle by means of the snap coupling. When the valve has reached its closed position and the filling needle is further withdrawn, the snap coupling is disengaged. A drawback of the known container is that the seat of the coupling member is liable to be damaged when the valve is fitted into the coupling member and when the valve is moved up and down relative to the coupling member.

Another disadvantage is that the radial opening in the valve adversely affects the accuracy to shape of the valve, as a result of which the sealing is no longer reliable.

SUMMARY OF THE INVENTION

It is an object of the invention to provide such a container as described above, which can be closed by withdrawing a filling needle and which provides a reliable sealing. To this end, the container in accordance with the invention wherein the positioning means are separate from the seat, and in its open position the valve is clear of the seat.

As a result of these measures the seat is loaded only when the valve is in its closed position. The only deformation of the seat caused thereby is an adaptation of the shape of the sealing surface of the valve, which merely improves the sealing. Besides, no damage of the seat occurs during mounting of the valve because the positioning means are separated from the seat. This assures a reliable sealing of the container.

The positioning means, which position and support the valve in its open position, enable the valve to be coupled very reliably to a filling needle having a head which engages behind the shoulder, as a result of which the valve is automatically returned to its closed position when the filling needle is withdrawn. Consequently, the equipment for filling and sealing the container can be simple and reliable and a short cycle time for filling and sealing is attainable.

It is to be noted that from WO 95/24972 a container is known having a sealing device which comprises a coupling member and a valve, the valve being positioned in its open position by flexible arms which connect the valve and the coupling member to one another. In order to form this connection the coupling member, the valve and the flexible arms are molded in one mold cavity. However, this has the disadvantage that the sealing surface of the valve is defined by two mold sections, as a result of which burrs are formed on this critical surface, which leads to unreliable sealing.

Furthermore, a container is known from EP-A-0 451 388, which container comprises a sealing device having a channel and a valve, the valve together with a number of resilient strips forming a separate part. However, in this sealing device the valve is urged into its closed position by the resilient strips, as a result of which it is necessary to constantly exert a force on the valve in order to keep the channel open. This sealing device is comparatively expensive and is susceptible to leakage because the resilient strips can only produce a limited force.

In an embodiment of the container in accordance with the invention the positioning means comprise at least one arm which extends in line with the channel and which is connected to the coupling member. As a result of this measure the coupling member can be manufactured simply by means of customary injection-molding techniques and the sealing device can be of a compact construction.

In another embodiment of the container in accordance with the invention the valve has a first stop and the positioning means have a second stop, which first and second stop cooperate to position the valve when the valve is in its open position. As a result of the cooperation between the stops the valve is supported in a well-defined position, thus enabling the valve to be coupled to a filling needle in a reliable manner.

In a preferred embodiment of the container in accordance with the invention the positioning means have at least one resilient lug by which the valve is fixed in its open position. Because of these measures air can be removed from the container before it is filled, without any special measures being taken to keep the valve in its open position.

In another embodiment of the container in accordance with the invention the positioning means are adapted to center the valve with respect to the seat. As a result of this measure the valve can be coupled to a filling needle via the channel and can be moved to the closed position with a linear up and down movement of the filling needle.

In other embodiments of the container in accordance with the invention (a) the positioning means have an opening for inserting the valve in a second direction transverse to the first direction. As a result of this measure the first and the second stop can be robust so that they can take up a substantial force. This reduces the loss of the valve as a result of insertion of a filling needle.

(b) the positioning means comprise a guide for guiding the valve between the open position and the closed position. As a result of this measure the valve can also cooperate with a filling needle while the valve is in an intermediate position between the first and the second position. Such a situation can readily arise as a result of transport of the sealing device.

(c) the valve has a recess which is accessible via the channel, and the shoulder is disposed on a wall of the recess. As a result of this measure the valve can be coupled to a thickened head of a filling needle by pushing the filling needle into the recess of the valve until the thickened head snaps behind the shoulder. Thus, the filling needle can be robust.

(d) in the closed position the valve cooperates with the seat by means of a press-fit. This has the advantage that a comparatively small force is necessary to move the valve into the closed position. As a result, the reliability of the sealing device is further improved.

BRIEF DESCRIPTION OF THE DRAWINGS

The invention will now be described in more detail, by way of example, with reference to the drawings, in which.

DESCRIPTION OF THE PREFERRED EMBODIMENTS

Figure 1:
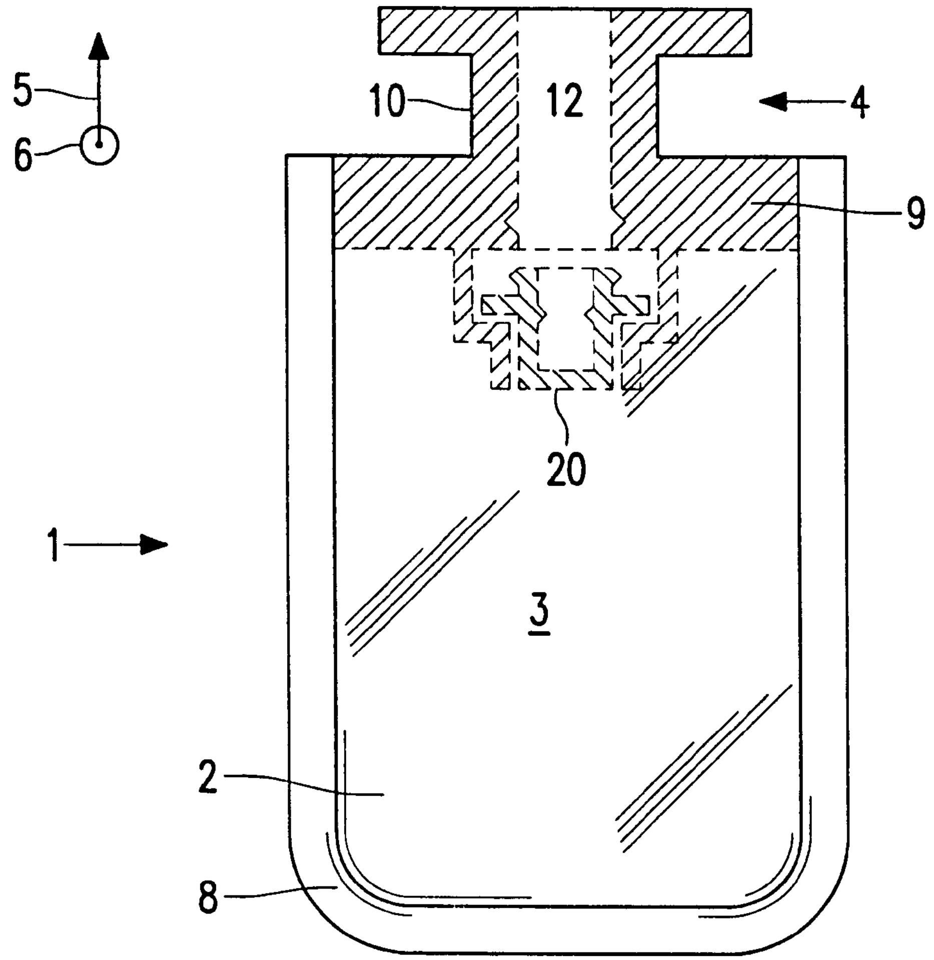
FIG. 1 shows diagrammatically a first embodiment of the container in accordance with the invention.

FIG. 1 shows diagrammatically a first embodiment of the container in accordance with the invention. The container 1 comprises a wall formed by two foils 2 sealed to one another along a seam 8. The wall defines a reservoir 3 for holding a fluid. The container 1 further comprises a sealing device 4 connected to the foil 2 via a weld 9. The sealing device 4 comprises a coupling member 10 having a seat 11 and a channel 12 which gives access to the reservoir. The sealing device 4 comprises a valve 20, which has been formed separately from the coupling member 10 and which is movable with respect to the coupling member 10 in a first direction 5 parallel to the channel 12 from an open position, in which the channel 12 is open (see FIG. 3), to a closed position, in which the valve 20 cooperates with the seat 11 and the channel 12 is closed (see FIG. 5).

Figure 2:
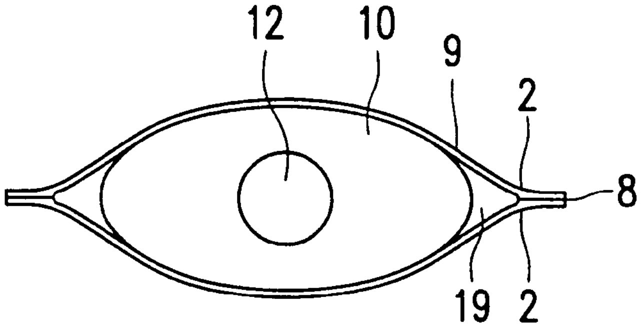
FIG. 2 is a plan view of the embodiment shown in FIG. 1.

FIG. 2 is a plan view of the embodiment shown in FIG. 1. The coupling member comprises a tapered flange 19 to which the foils 2 have been welded via a weld 9.

Figure 3:
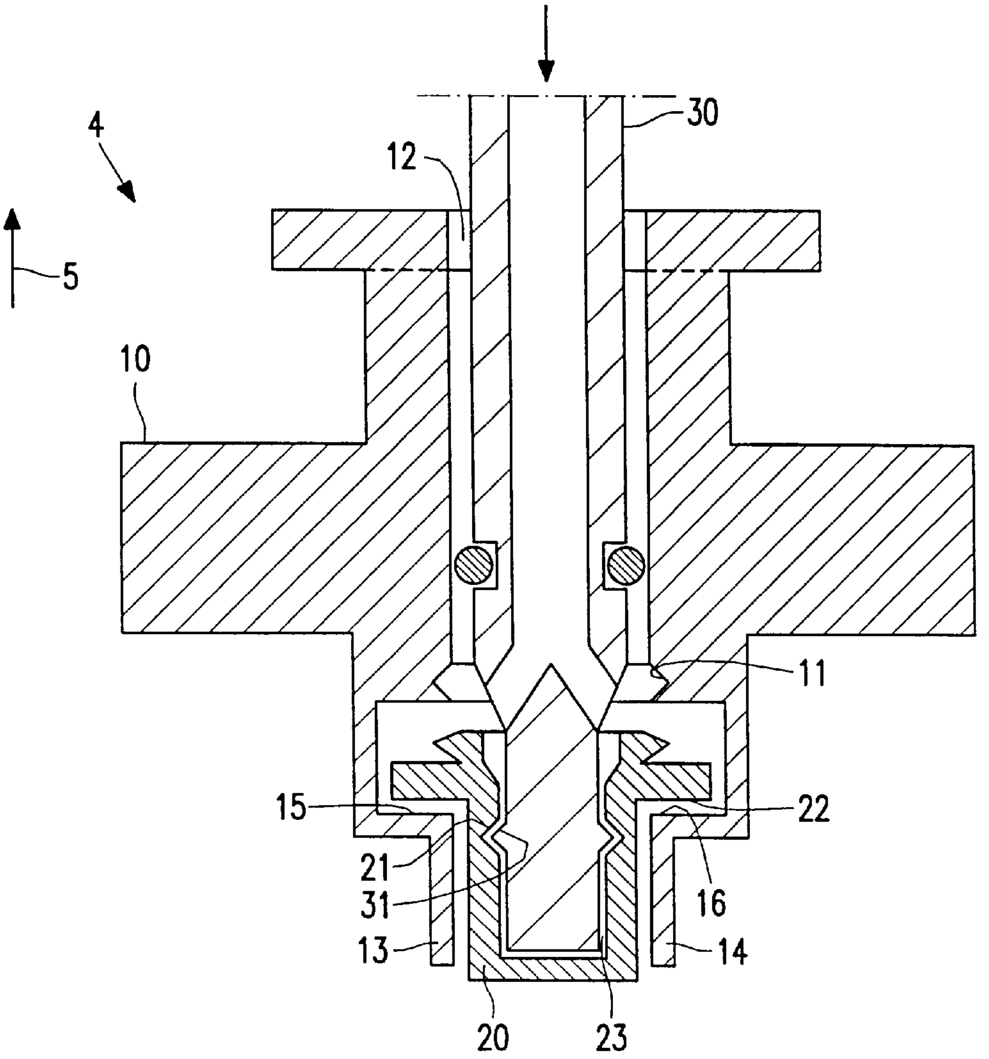
FIG. 3 is a sectional view of the sealing device in the first embodiment, the valve being shown in the open position.

FIG. 3 is a sectional view of the sealing device in the first embodiment, the valve being shown in the open position and a filling needle projecting into the sealing device. The sealing device 4 comprises positioning means, in the present case two arms 13 and 14, which position the valve 20 in its open position with respect to the channel 12 and which support the valve 20 in the direction 5. The arms 13 and 14 are separate from the seat 11 and the valve 20 is clear of the seat 11 in its open position. The arms 13 and 14 extend in line with the channel 12 and have been molded integrally with the coupling member 10. At their ends the arms 13 and 14 each have a resilient lug by means of which the valve 20 is clamped in its open position. The valve 20 has a stop 22 and the arms 13 and 14 have stops 15 and 16. The valve 20 has been formed with a recess 23 which is accessible from the channel 12. The wall of the recess 23 has a shoulder 21 to exert a force on the valve 20 in the direction 5. The shoulder 21 is accessible via the channel 12 in order to move the valve 20 from the open position to the closed position (see FIG. 5). When the filling needle 30 is inserted into the channel 12, the thickened head 31 of the filling needle 30 will urge the valve into its open position, the stop 22 cooperating with the stops 15 and 16. When the filling needle is pressed deeper into the channel the thickened head 31 will be moved past the shoulder 21 and the valve 20 is coupled to the filling needle 30.

Figure 4:
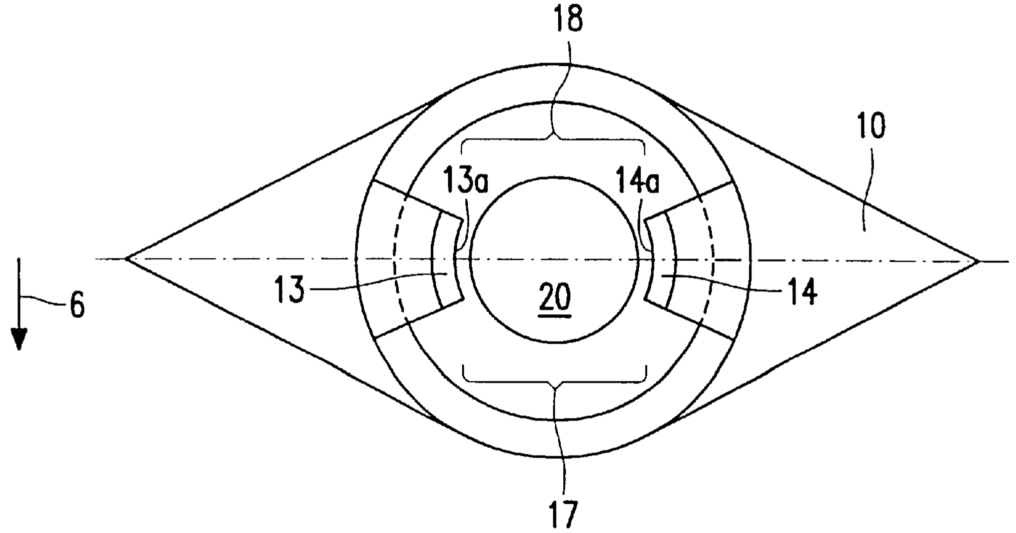
FIG. 4 is an underneath view of the sealing device in the first embodiment.

FIG. 4 is an underneath view of the sealing device in the first embodiment. This underneath view shows that the arms 13 and 14 are adapted to center the valve 20 with respect to the seat 11 by means of the arms 13 and 14. Between the arms 13 and 14 two openings 17 and 18 are formed, enabling the valve to be fitted between the arms 13 and 14 in a direction 6 transverse to the direction 5.

Figure 5:
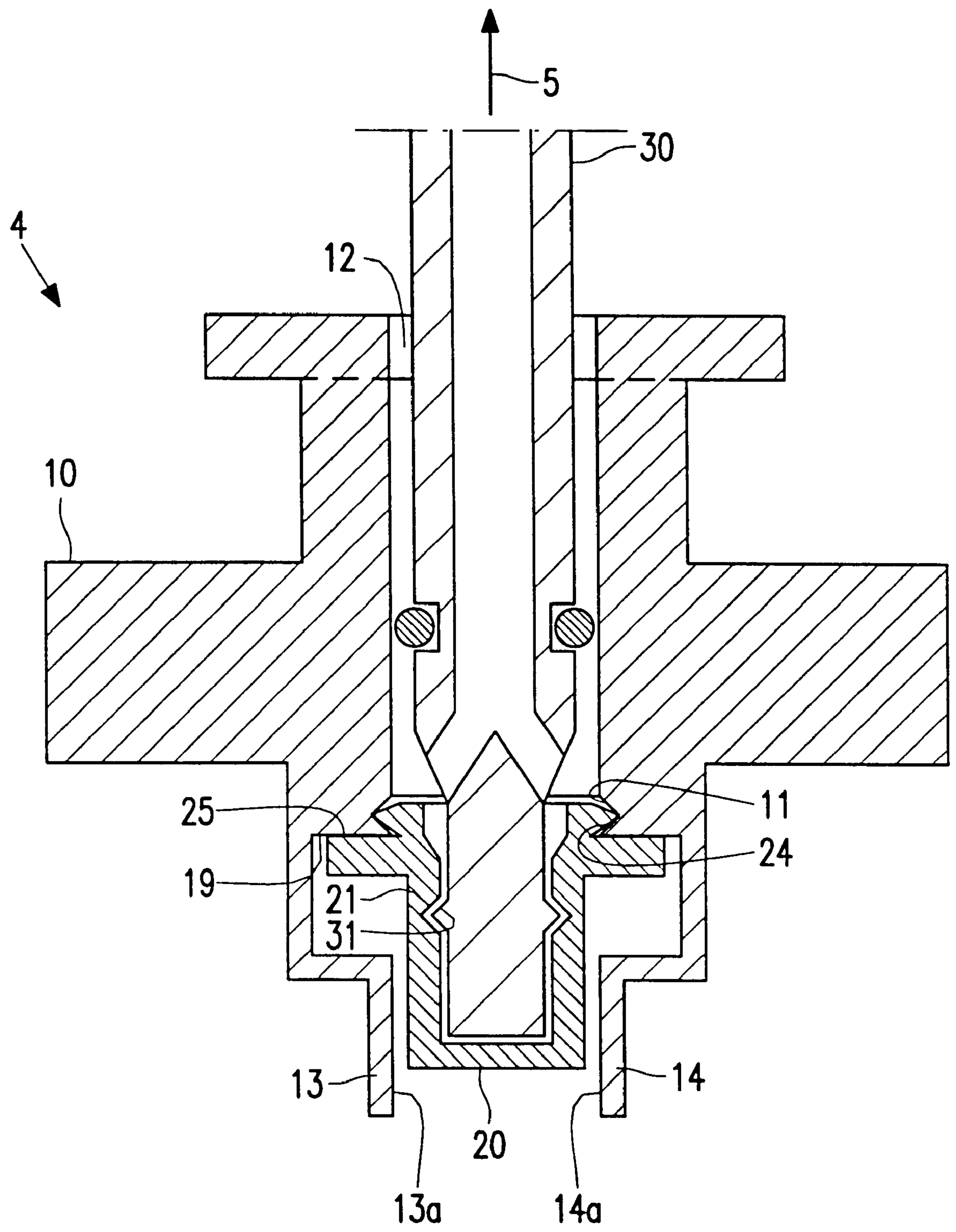
FIG. 5 is a sectional view of the sealing device in the first embodiment, the valve being shown in the closed position.

FIG. 5 is a sectional view of the sealing device in the first embodiment, the valve being shown in the closed position. This closed position is reached by moving the filling needle 30 in the direction 5 from the situation shown in FIG. 3. Owing to the coupling between the valve 20 and the head 31 of the filling needle 30 the valve 20 is moved in the direction 5 until the ridge 24 on the valve 20 engages in the seat 11 of the coupling member 10 and the surface 25 of the valve 20 abuts against the surface 19 of the coupling member 10. If the filling needle is moved on in the direction 5 from the situation shown in FIG. 5, the thickened head 31 will again be moved past the shoulder 21 of the valve 20, as a result of which the valve 20 is disengaged from the filling needle 30. Between its open position and its closed position the valve 20 is guided by the curved surfaces 13*a* and 14*a* (see FIG. 4). The valve 20 is rotationally symmetrical, as a result of which it can be manufactured with a high accuracy to shape, which is beneficial for the reliability of the sealing device.

Figure 6:
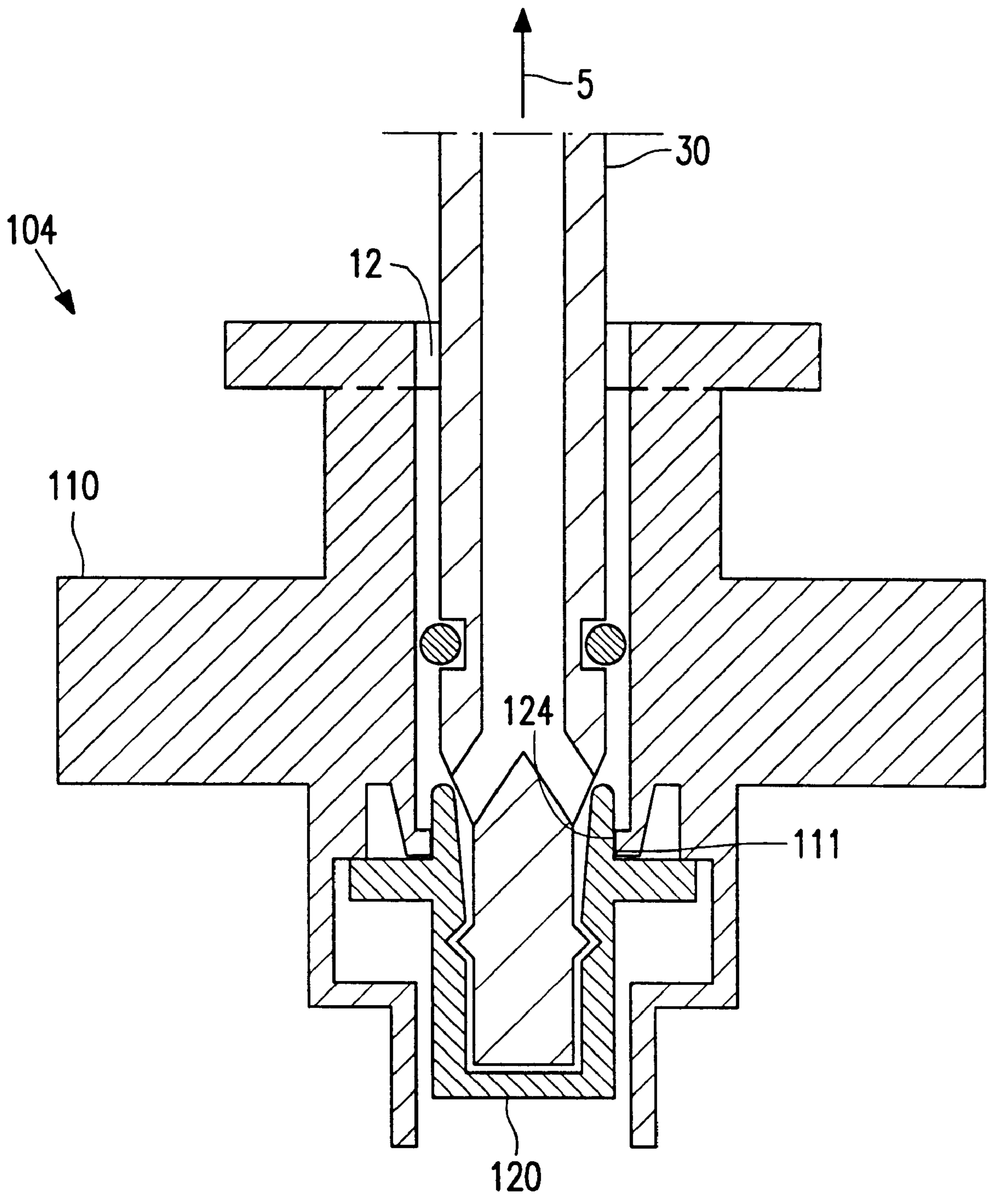
FIG. 6 is a sectional view of the sealing device in a second embodiment, the valve being shown in the closed position.

FIG. 6 is a sectional view of the sealing device in a second embodiment, the valve being shown in the closed position. The sealing device 104 comprises a coupling member 110 having a cylindrical seat 111 and a valve 120 having a cylindrical sealing surface 124. The sealing surface 124 is a press-fit in the seat 111. The coupling member 110 is thin-walled at the location of the seat 111, as a result of which the seat 111 is slightly flexible. This results in a reliable sealing, while only a comparatively small force is required to draw the valve 120 into the seat 111.

It is to be noted that the invention is not limited to the embodiments shown herein. The valve can be manufactured in a mold, the sealing surface being defined by one mold section. Moreover, the valve can be manufactured from another material than the coupling member, enabling the valve and the coupling member to be optimized independently of one another. Thus, the material of the coupling member (for example polyethylene) can be selected in such a manner that, for example, a proper weld can be formed to a flexible pouch, and the material of the valve (for example rubber) can be selected in such a manner that a proper sealing is achieved.

What is claimed is:

1. A container comprising a wall which defines a space for holding a fluid, and a sealing device connected to the wall, which sealing device comprises a coupling member having a seat and a channel which gives access to the space, a valve, which has been formed separately from the coupling member and which is movable with respect to the coupling member in a first direction parallel to the channel from an open position, in which the channel is open, to a closed position, in which the valve cooperates with the seat and the channel is closed, a shoulder for exerting a force on the valve in the first direction, which shoulder is accessible via the channel to move the valve from the open position to the closed position, positioning means which position the valve in its open position with respect to the seat and which support the valve in said first direction, wherein the positioning means separate from the seat, and in its open position the valve is clear of the seat.

2. A container as claimed in claim 1, wherein the positioning means comprise at least one arm which extends in line with the channel and which is connected to the coupling member.

3. A container as claimed in claim 1, wherein the valve has a first stop and the positioning means have a second stop, which first and second stop cooperate to position the valve when the valve is in its open position.

4. A container as claimed in claim 1, wherein the positioning means have at least one resilient lug by which the valve is fixed in its open position.

5. A container as claimed in claim 1, wherein the positioning means are adapted to center the valve with respect to the seat.

6. A container as claimed in claim 1, wherein the positioning means have an opening for inserting the valve in a second direction transverse to the first direction.

7. A container as claimed in claim 1, in which the positioning means comprise a guide for guiding the valve between the open position and the closed position.

8. A container as claimed in claim 1, wherein the valve has a recess which is accessible via the channel, and the shoulder is disposed on a wall of the recess.

9. A container as claimed in claim 1, wherein in the closed position the valve comprises a sealing surface which cooperates with the seat by means of a press-fit.

10. A sealing device comprising a coupling member having a seat and a channel, a valve, which has been formed separately from the coupling member and which is movable with respect to the coupling member in a first direction parallel to the channel from an open position, in which the channel is open, to a closed position, in which the valve cooperates with the seat and the channel is closed, a shoulder for exerting a force on the valve in the first direction, which shoulder is accessible via the channel to move the valve from the open position to the closed position, positioning means which position the valve in its open position with respect to the seat and which support the valve in said first direction, wherein the positioning means are separate from the seat, and in its open position the valve is clear of the seat.

11. A sealing device as claimed in claim 10, wherein the positioning means comprise at least one arm which extends in line with the channel and which is connected to the coupling member.

12. A sealing device as claimed in claim 10, wherein the valve has a first stop and the positioning means have a second stop, which first and second stop cooperate to position the valve when the valve is in its open position.

13. A sealing device as claimed in claim 10, wherein the positioning means have at least one resilient lug by which the valve is fixed in its open position.

14. A sealing device as claimed in claim 10, wherein the positioning means are adapted to center the valve with respect to the seat.

15. A sealing device as claimed in claim 10, wherein the positioning means have an opening for inserting the valve in a second direction transverse to the first direction.

16. A sealing device as claimed in claim 10, in which the positioning means comprise a guide for guiding the valve between the open position and the closed position.

17. A sealing device as claimed in claim 10, wherein the valve has a recess which is accessible via the channel, and the shoulder is disposed on a wall of the recess.

18. A sealing device as claimed in claim 10, wherein in the closed position the valve comprises a sealing surface which cooperates with the seat by means of a press-fit.

* * * * *